(No Model.)
J. T. COWLEY.
DRILLING APPARATUS.
No. 486,856. Patented Nov. 29, 1892.
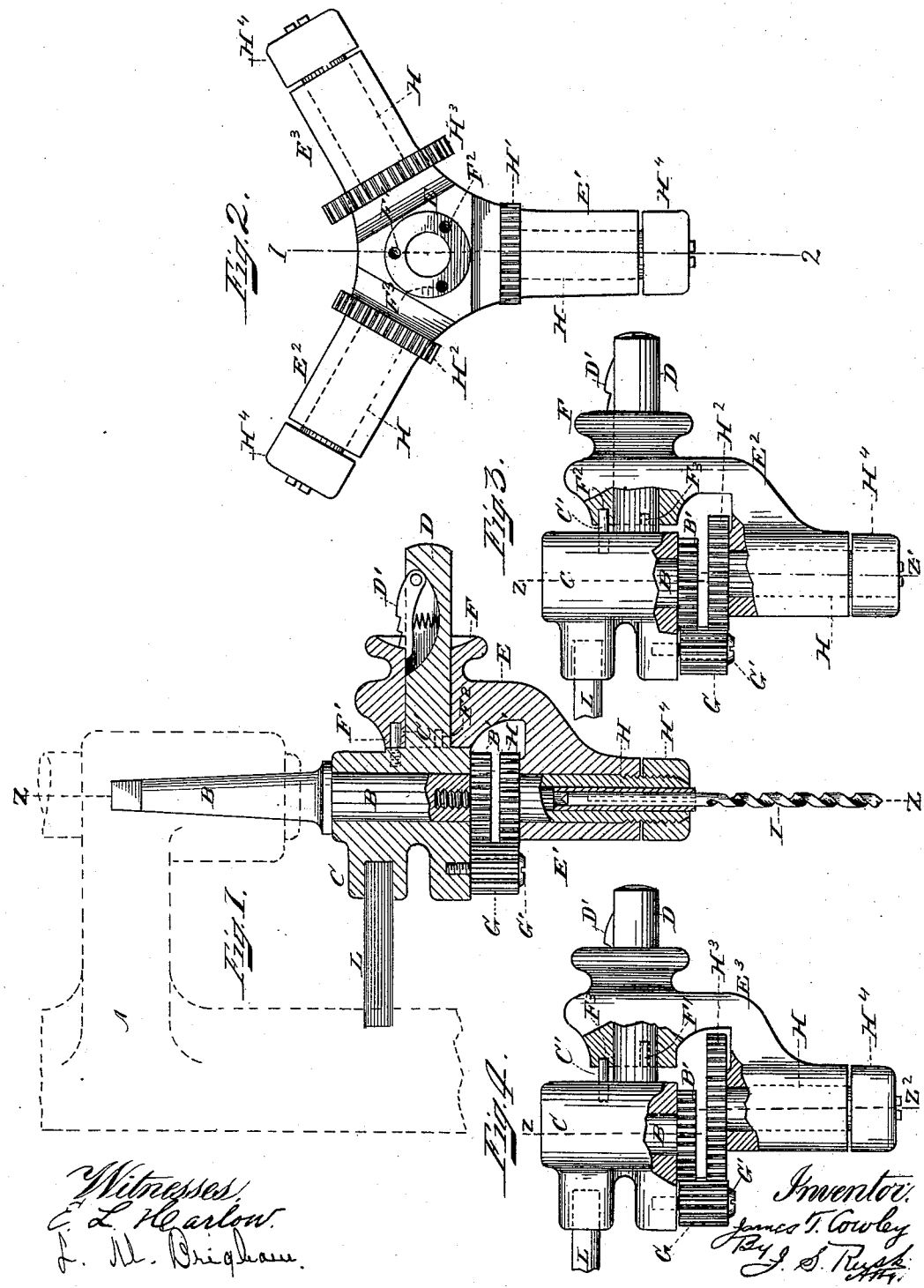

UNITED STATES PATENT OFFICE.

JAMES T. COWLEY, OF LOWELL, MASSACHUSETTS.

DRILLING APPARATUS.

SPECIFICATION forming part of Letters Patent No. 486,856, dated November 29, 1892.

Application filed January 11, 1892. Serial No. 417,640. (No model.)

*To all whom it may concern:*

Be it known that I, JAMES T. COWLEY, of Lowell, in the county of Middlesex and State of Massachusetts, have invented a new and useful Improvement in Drilling Apparatus, of which the following, taken in connection with the accompanying drawings, is a specification.

My invention relates to drill-press and tapping-machine attachments, especially to that class of machinery wherein a series of tools is to be used in succession or any desired order.

My invention has for its object to provide a machine in which the tools to be brought into operative relation with the article to be worked may be connected in succession or in any desired order to a single spindle, so that the adjustment of the article need not be changed upon a change of tools.

My invention has a further object to provide a machine in which the tools connected in succession or any desired order to a single spindle may be varied in speed. These and other objects are accomplished by my invention, which will be hereinafter fully set forth and explained.

My invention consists of certain novel features, arrangements, and combinations of parts, as will hereinafter appear.

In the drawings which accompany this specification and form a part thereof, Figure 1 represents a vertical section of my apparatus, taken on the line 1 2 of Fig. 2, showing parts of the device in elevation. Fig. 2 is a front elevation of the drill-head removed from the drilling apparatus. Figs. 3 and 4 are detail views showing the connection to the main spindle of different tools from the one shown in Fig. 1.

Like letters of reference refer to like parts throughout the several views.

In constructing machinery it is found necessary that one part should be successively operated upon by several drills of different sizes or shapes or by drills followed by reamers, facing and countersinking tools, or screw-taps, and for securing accuracy in working it is necessary, or at least desirable, that the article which is to be operated upon should not be moved from its position until all the tools have been used.

In the machine I have provided a head or turret which has journaled therein a number of independent drill-spindles and is in turn journaled upon a right-angled arm of a sleeve secured upon the end of the main drill-spindle, whereby upon the rotation of the drill-head upon its journal any desired spindle may be brought into connection will the main drill-spindle, and thereby caused to engage with and be rotated by the same, as will hereinafter fully appear.

In carrying out my invention I journal upon the lower end of the spindle B of an ordinary drill-press a sleeve C, from one side of which an arm L extends radially outward and engages with a standard or rod of the frame A to prevent the rotation of the said sleeve C.

From a point on the sleeve C, preferably diametrically opposite to the arm L, a second arm D extends at right angles to the said sleeve and spindle and forms a journal for the head E, which is adapted to rotate freely on said arm D. A handle F is provided on said head for moving the same longitudinally on the arm D. Said head is locked in position by means of a spring-catch D', pin C', and cavity F', as shown in Fig. 1, during the operation of the tool I. In the extensions E', E², and E³, which project from the said head E, there is arranged a slit clamp or clutch H, which is clamped by a nut H⁴, securing the tool I in position. The clutches for each of the extensions E', E², and E³ are provided on their upper ends with flanges H', H², and H³, respectively, provided with a series of teeth adapted to mesh with the teeth of a pinion G, which is adapted to rotate upon a journal G', secured to the sleeve C. The flanges H', H², and H³ are respectively provided with twenty, twenty-five, and thirty teeth. By means of the cogged flanges H', H², and H³ of different diameters I am enabled to run the spindles at varying speeds, as may be desired in special work, and have carried out the same, as will now appear.

From the sleeve C projects a pin C', over which are adapted to fit in turn the cavities F' F² F³, said cavities decreasing in depth from F' to F³, so that when it is desirable to have the tool which is secured to the clamp in extension E' brought into operative connection with the cog G the head E is rotated until the cavity F' fits over the pin C', as shown in Fig. 1, in which position cog B' on the end of the spindle B meshes with the pinion G, and the motion of the said pinion is transmitted to the clamp H through the teeth on its upper flange H'.

In such construction as shown in Fig. 1 the axis of rotation of the tool is in line with the axis of rotation of the spindle, as indicated by the line of rotation Z Z. If it is desired to change the tool the catch D' is pressed down, and by means of the handle F the head E is drawn along the arm D, thereby withdrawing the teeth of the flange H' of the clutch H of the extension E' from contact with the pinion G, and also removing the pin C' from the cavity F' of the said head E, thus liberating the head from its locked position and permitting it to be rotated upon its journal D. If the tool in the extension E² is desired the head is rotated until the cavity F² is in line with the pin C'. The head is pushed inwardly, so that the said cavity F² fits over the said pin C', (see Fig. 3,) and the teeth on the flange H² of the clutch H of the extension E² mesh with the teeth on the pinion G, and the catch D' takes the position as shown, thereby holding the head in a locked position. As the diameter and the number of teeth on the said flange H² are greater than the diameter and the number of teeth on the flange H' the velocity of rotation of the clutch and tool in the extension E² will be decreased. As the number of teeth on the cog-wheel B' and the pinion G always remains the same the variations of speed are due to the change in the diameter and the number of teeth upon the flanges H' H² H³ of the clutches H in the three extensions E' E² E³, so that the velocity of rotation of the tool varies as the axis of rotation of the tool moves from alignment with the axis of rotation of the main spindle, as indicated by the line Z' Z', Fig. 3. If the tool in the extension E³ is required the catch D' is pressed down and the head E drawn along the rod in a manner, as above described, and revolved until the cavity F³ is in line with the pin C'. The head is pushed inwardly along the said rod until said cavity F³ fits over the pin C', (see Fig. 4,) and the teeth on the flange H³ mesh with the teeth on the pinion G and the catch D' takes the position as shown. In this position the teeth of the flange H³ of the clutch H of the extension E³ engage with the teeth of the pinion G, and the tool in the said clutch is revolved at a less velocity than either of the tools in the clutches journaled in extensions E' or E², for the reason that the diameter and the number of teeth of the flange H³ are greater than the diameter and number of teeth of the flanges H' H² of either of the other clutches, so that the velocity of rotation of the clutch and tool of the extension E³ is less than the velocity of rotation of either of the other tools, the distance between the axis of rotation of the main spindle and the axis of rotation of the tool increasing over that shown in Fig. 3. In other words, the velocity of rotation of the tool is varied in decreasing proportion as the distance between the axis of rotation of the tool and the axis of rotation of the main spindle increases, as shown in the figures of the drawings. By mounting the head E upon the right-angled arm D of the sleeve C, I am enabled to have the cogs on the flanges H', H², and H³ of the clutches accurately engage with the pinion G and easily disengage therefrom when it is desired to change the tool to adjust said head in proper position, so as to have the cavities F' F² F³ in turn fit accurately over the pin C' and lock the head in proper position with the assistance of the spring-catch D' against movement while any of the tools are being operated.

While the drawings show and the description sets forth constructions in which by increasing the diameter and number of teeth on the flanges of the clutches, the velocity of rotation of the special spindles varies in decreasing proportion as the distance between the axis of rotation of the special spindles and the axis of rotation of the main spindle increases, yet it is obvious that the variations of speed would also occur if the diameters and number of teeth on the flanges of the clutches were decreased from that shown in Fig. 1. In such case the velocity of rotation of the special spindles would vary in increasing proportion as the diameter of the flanges and the number of teeth thereon decreased, or, in other words, that the velocity of rotation of the special spindles varies in increasing proportion as the distance between the axis of rotation of the special spindles and the axis of rotation of the main spindle increases.

From the above it will be seen that in both cases the variations of the velocity of rotation of the special spindles would increase as the distance between the axis of rotation of the special spindles and the axis of rotation of the main spindle was increased, or that the further the axis of rotation of the special spindles was moved out of alignment with the axis of rotation of the main spindle the greater would be the variations of speed.

The variations of velocity of rotation of the special spindles, as the axis of rotation of the said special spindles and the axis of rotation of the main spindle are moved out of alignment, I deem an important part of my invention as I am not aware that the same has been heretofore accomplished.

In applying the mechanism described to drilling-machines I do not limit myself to drill-presses proper, as it is equally adapted to machines having horizontal spindles, it being obvious that there is no difference in the principle of operation whatever the position of such spindle.

I do not limit myself to the exact construction shown, as the same may be varied without departing from the spirit of my invention; but I intend to claim my invention broadly, as will appear from the claims hereto annexed.

Having thus ascertained the nature and set forth the construction of my invention, what I claim as new, and desire to secure by Letters Patent of the United States, is—

1. The combination, with a driven gear-wheel, of an arm, a revoluble and longitudinally-movable drill-head mounted thereon and having a plurality of extensions, a spindle contained in each of the said extensions and having upon its inner end a pinion, the pinions of the different spindles differing in size and number of teeth and being adapted to gear with the said gear-wheel, whereby the speed with which the said spindles are driven will vary with the distance that may exist between their axis and that of the gear-wheel, substantially as described.

2. In a drilling apparatus, the combination of a main spindle, having a gear-wheel thereon, a sleeve mounted on the said spindle and having an arm projecting therefrom at right angles to the axis of the spindle, a drill-head journaled on the said arm and longitudinally movable thereon and having radial extensions, spindles contained in the said extensions and having pinions thereon adapted to engage the said gear-wheel, and means for imparting motion from the said main spindle to the spindles within the extensions, substantially as described.

3. In a drilling apparatus, the combination, with a main spindle having a pinion thereon, of a sleeve mounted on the said spindle and having an arm projecting therefrom at right angles thereto, a drill-head mounted on the said arm and longitudinally and revolubly movable thereon, means for locking the head against the said movements, radial extensions formed upon the said head, spindles having pinions contained in the said extensions, and a gear-wheel mounted on the said sleeve and engaging with the pinion upon the main spindle and the spindles in the extensions, substantially as described.

4. In a drilling apparatus, the combination, with a main spindle having a pinion thereon, of a sleeve mounted on the said spindle and having an arm projecting therefrom, a drill-head having a plurality of extensions journaled upon the said arm, spindles contained in the said extensions, having pinions upon their inner ends, and a cog-wheel mounted on the sleeve and engaging with the said pinions upon the main spindle and the spindles contained in the said extensions, substantially as described.

5. In a drilling apparatus, the combination, with a main spindle having a pinion thereon, of a suitably-journaled drill-head having a plurality of extensions, a spindle contained in each of the said extensions and having upon its inner end pinions, the pinions of the different spindles differing in size and number of teeth, and a suitably-journaled gear-wheel gearing with the pinions upon the main spindles and the spindles in the said extensions, whereby the speed with which the last-named spindles are driven will vary with the distance that may exist between their axis and the axis of the main spindle, substantially as described.

6. In a drilling apparatus, the combination of a main spindle having a pinion thereon, a sleeve mounted on the said spindle and having an arm projecting at right angles thereto, a drill-head journaled and longitudinally movable upon said arm and provided with extensions, a spindle contained in each of the said extensions and having a pinion upon its inner end, the several pinions differing in size and number of teeth, and a gear-wheel journaled upon the said sleeve and gearing with the pinions upon the main spindle, and the spindles in the extensions, whereby the speed with which the last-named spindles are driven will vary with the distance that may exist between their axis and the axis of the main spindle, substantially as described.

7. In a drilling apparatus, the combination, with a main spindle having a pinion thereon, of an arm extending at right angles to the axis of the said spindle, a drill-head having a plurality of extensions journaled and longitudinally movable upon the said arm, means for locking the said head in position on the said arm, a spindle contained in each of the said extensions and having upon its inner end pinions, the pinions of the different spindles differing in size and number of teeth, and a suitably-journaled gear-wheel gearing with the pinions upon the main spindles and the spindles in the said extensions, whereby the speed with which the last-named spindles are driven will vary with the distance that may exist between their axis and axis of the main spindle, substantially as described.

8. In a drilling apparatus, the combination, with a main spindle, of an arm at right angles thereto, a drill-head having a plurality of extensions journaled on the said arm, a spindle contained in each of the said extensions and having upon its inner end pinions, the pinions of the different spindles differing in size and number of teeth, and a suitably-journaled gear-wheel gearing with the pinions upon the main spindles and the spindles in the said extensions, whereby the speed with which the last-named spindles are driven will vary with the distance that may exist between their axis and axis of the main spindle, substantially as described.

9. In a drilling apparatus, the combination, with a main spindle having a pinion thereon, of a sleeve mounted on the said spindle and having an arm projecting at right angles thereto, a drill-head having a plurality of extensions journaled on the said arm, a spindle contained in each of the said extensions and having a pinion upon its inner end, the several pinions differing in size and number of teeth, and a gear-wheel journaled upon the said sleeve and gearing with the pinions upon the main spindle and the spindles in the extensions, whereby the speed with which the last-named spindles are driven will vary with the distance that may exist between their axis and the axis of the main spindle, substantially as described.

10. The combination, with the frame of a press, of a main drill-spindle supported thereon, a sleeve mounted on said spindle, an arm secured to said sleeve at a right angle thereto and at a right angle to the said spindle, a drill-head mounted on said arm carrying a number of spindles and provided with cavities, a pin secured to and extending from the said sleeve, said head by its cavities adapted to be connected to the said pin, and a catch for holding said head in connection with said pin, substantially as set forth.

11. The combination, with the frame of a press, of a main drill-spindle supported thereon, a sleeve mounted on said spindle, an arm secured to said sleeve, a drill-head mounted on said arm carrying a number of spindles and provided with cavities of different depths, a pin secured to and extending from the said sleeve, said head adapted to be connected to the said pin and to assume different positions on its journal by means of its cavities and the said pin, and means for holding said head in connection with said pin, substantially as set forth.

In testimony whereof I have signed my name to this specification, in the presence of two subscribing witnesses, on this 8th day of January, A. D. 1892.

JAMES T. COWLEY.

Witnesses:
E. L. HARLON,
GEORGE M. BRIGHAM.